United States Patent
Anselmann et al.

(10) Patent No.: US 6,302,926 B1
(45) Date of Patent: Oct. 16, 2001

(54) PREPARATIONS OF MONODISPERSE SPHERICAL OXIDE PARTICLES

(75) Inventors: Ralf Anselmann, Munster-Altheim; Carsten Griessmann, Gross-Zimmern; Manuela Loch, Merxheim; Kurt Marquard, Reinheim, all of (DE)

(73) Assignee: Merck Patent Gesellschaft mit beschrankter Haftung (DE)

( * ) Notice: Subject to any disclaimer, the term of this patent is extended or adjusted under 35 U.S.C. 154(b) by 0 days.

(21) Appl. No.: 08/488,288

(22) Filed: Jun. 7, 1995

(30) Foreign Application Priority Data

Jun. 24, 1994 (DE) .................................. 44 22 118

(51) Int. Cl.⁷ .................. C01B 33/113; C01G 25/02; C01G 23/047; C01F 7/02
(52) U.S. Cl. .................. 23/313 R; 423/335; 423/608; 423/610; 423/625
(58) Field of Search .................. 23/313 R, 313 AS, 23/313 P, 313 FB; 106/442; 423/335, 608, 610, 625

(56) References Cited

U.S. PATENT DOCUMENTS

| | | | |
|---|---|---|---|
| 4,701,218 | * | 10/1987 | Barker et al. ................. 106/114 |
| 4,943,301 | * | 7/1990 | Wasle et al. ................. 23/313 R |
| 5,346,546 | * | 9/1994 | Kaliski ................. 106/436 |

OTHER PUBLICATIONS

Perry et al, Ed. Chemical Engineers Handbook 5th Edition McGraw Hill Book Co NY NY 1973, pp. 8–57 to 8–65.*
Browning, Jon, Agglomeration: Growing Larger in Applications and Technology. Chemical Engineering Dec. 4, 1967 pp 147–170.*

* cited by examiner

Primary Examiner—Steven P. Griffin
(74) Attorney, Agent, or Firm—Millen, White, Zelano & Branigan, P.C.

(57) ABSTRACT

The invention relates to preparations of monodisperse spherical oxide particles in the form of free-flowing powders of agglomerates in which the particles are bonded to one another by a binder. With these preparations, the oxide particles can be homogeneously dispersed in polymer systems with particular ease.

7 Claims, No Drawings

PREPARATIONS OF MONODISPERSE SPHERICAL OXIDE PARTICLES

The invention relates to preparations of monodisperse spherical oxide particles with which it is particularly easy to disperse the oxide particles homogeneously in polymer systems.

Spherical oxide particles, in particular $SiO_2$ particles, but also $TiO_2$, $ZrO_2$ and $Al_2O_3$ particles, are employed in industrial and scientific applications in diverse ways. It is known that particularly advantageous use properties result if these particles are in monodisperse form, that is to say have the lowest and narrowest possible particle size scatter at a given particle size. An essential industrial use of monodisperse spherical oxide particles is, for example, the use as a filler and modifying agent in polymer materials. In this case, the particles often not only have a substitution and dilution function, but impart to the polymeric matrix material certain properties or functions for the first time. Such particles are thus employed as optical diffusers in embedding compositions for light-emitting diodes or as fillers which reduce thermal stresses in transparent casting compositions for other optical, electro-optical and optoelectronic components. These particles are used in films of plastic, for example for magnetic recording media, to improve the slip properties. They can furthermore be used as opacifying agents in dental compositions. Reference may be made, for example, to the patent documents WO 94/07 948, WO 93/25 611 and EP 0 236 945 A2 with respect to such uses, in which monodisperse spherical oxide particles are particularly advantageous because of their monodispersity.

When used industrially, these oxide particles are in general not incorporated into polymeric binder systems in the form of the native powder. This is because handling in practice and in particular the preparation of homogeneous agglomerate-free and non-sedimenting dispersions of the oxide particle powders with the polymer systems is difficult for the user above all. The oxide particles are therefore preferably provided in a predispersed form specific to the use, whereby later incorporation into the intended polymer systems is said to be facilitated. For example, dispersions in aliphatic alcohols, glycols and oligoglycols are customary. Constituents of the polymeric binder systems into which they are to be incorporated later are occasionally also used as the dispersing medium.

Nevertheless, the oxide particles turn to sediment in such dispersions, especially during prolonged storage. It has been shown that precisely with highly monodisperse spherical oxide particles, sediments with highly ordered structures which approximately resemble the closest spherical packing are formed. Such sediments can be redispersed again only with great difficulty, and it is scarcely possible to achieve the original state of a homogeneous agglomerate-free dispersion again.

Another disadvantage of the use of oxide particles in predispersed form is that at an oxide particle content of as a rule not more than 50% by weight, not inconsiderable amounts of dispersing medium are also incorporated into the polymer system. Attention must be paid to compatibility problems here, and the recipes need to be adjusted accordingly in each case.

The object was therefore to provide monodisperse spherical oxide particles in such a form which is itself stable and with which the particles can be incorporated homogeneously into polymer systems without problems and without thereby also incorporating undesirable amounts of other auxiliaries.

It has now been found that preparations of monodisperse spherical oxide particles having particle diameters of between 10 nm and 10 μm and an essentially non-volatile binder in the form of a free-flowing powder of agglomerates having diameters of between 1 μm and 500 μm, in which 70 to 95% by weight of oxide particles and 30 to 5% by weight of binder are present, meets these requirements in an excellent manner.

Such preparations can be obtained, for example, by mixing the oxide particles homogeneously with the binder in a corresponding ratio together with a solvent which is volatile at temperatures of between 0 and 120° C. under a pressure between 1 and 0.1 bar, the binder and solvent being present in a weight ratio of 1:1 to 1:100, and then removing the solvent from the resulting suspension or dispersion by distillation.

The invention therefore relates to preparations, characterized as above, of monodisperse spherical oxide particles.

The invention furthermore relates to a process for the preparation of such preparations in which 70 to 95% by weight of monodisperse spherical oxide particles having a particle diameter of between 10 nm and 10 μm are is mixed homogeneously with 30 to 5% by weight of an essentially non-volatile binder together with a solvent which is volatile at elevated temperature and/or under reduced pressure, the binder and solvent being present in a weight ratio of 1:1 to 1:100, and the solvent is then removed from the resulting suspension or dispersion by distillation, a free-flowing powder of agglomerates having diameters between 1 μm and 500 μm being obtained.

All monodisperse spherical oxide particles, the particle diameter of which is in the range between 10 nm and 10 μm, are in principle suitable for the preparations according to the invention. The term monodisperse is to be understood as meaning that the particles of a certain diameter have the lowest possible particle size scatter lying within a very narrow range. Monodisperse spherical oxide particles having a standard deviation of the particle diameter of less than 10%, and in particular less than 5%, are preferred. The particle sizes are preferably in the range between 100 nm and 1 μm, in particular between 250 nm and 500 nm. All the customary solid oxides or oxidic materials, such as, in particular, metal oxides, are in principle suitable as the base materials of the particles. Oxide particles which comprise $SiO_2$, $TiO_2$, $ZrO_2$, $Al_2O_3$ or corresponding mixed oxides are preferred. Particles of $SiO_2$ and $TiO_2$, but in particular of $SiO_2$, are particularly preferred. They can be prepared in any desired manner per se, as long as the particles are monodisperse and spherical, and preferably furthermore compact and non-porous.

The monodisperse spherical oxide particles to be used according to the invention are known per se from the prior art. Oxide particles which can be obtained by hydrolytic polycondensation from alcoholate compounds of corresponding elements and are thereby obtained in the form of monodisperse compact spherical particles are particularly suitable. The basic reaction conditions for preparation of $SiO_2$ particles by hydrolytic polycondensation can be found, for example, in the publications by W. Stöber et al. in J. Colloid and Interface Science 26, 62 (1968) and 30, 5168 (1969) and U.S. Pat. No. 3,634,588. Other particles, such as, for example, $TiO_2$ or $ZrO_2$, can also be prepared by this method. For the preparation of highly monodisperse non-porous spherical $SiO_2$ particles which have a standard deviation of not more than 5%, reference is made to EP 0 216 278, which discloses a correspondingly targeted preparation process based on hydrolytic polycondensation. The core of the process which is particularly preferred for the preparation of the particles according to the present invention is a two-stage procedure. In this, a sol or a suspension of primary particles is first formed by hydrolytic polycondensation of tetraalkoxysilanes in an aqueous-alcoholic-ammoniacal medium and is then subsequently brought to the desired final size by metered addition of further tetraalkoxysilane. The process according to EP 0 216 278 can be applied without reservation and with the same result to other oxides and also to mixed oxide systems. An appropriate process for the preparation of various metal oxides in the form of spherical particles having a narrow particle size distribution is to be found in EP 0 275 688. A corresponding two-stage process for the preparation of various metal oxides and also mixed oxides which moreover also have glycolic groups bonded chemically to the surface is furthermore described in EP 0 391 447.

An organic modification of the particles on the surface, which may be advantageous for the particular intended use, can be carried out in complete agreement with methods such as are known for the preparation of silica gels which are customary as chromatographic sorbents. The usual modifying agents are organotrialkoxysilanes, such as, for example, methyltriethoxysilane, ethyltriethoxysilane, octyltriethoxysilane, octadecyltriethoxysilane and mono- or polyfluoroalkyltriethoxysilane, or else silanes having functionalized organic groups, which allow later further modification by linking of covalent bonds in a known manner. In the latter case, such organotrialkoxysilanes are preferred in respect of the use according to the invention of the particles as fillers in polymeric or polymerizable systems which contain those functional groups with which covalent bonding into the polymer material can be achieved. Examples here are trimethoxyvinylsilane, triethoxyvinylsilane and 3-glycidyloxypropyltrimethoxysilane, 2-(3,4-epoxycyclohexyl)-ethyltrimethoxysilane, [2-(3,4-epoxy-4-methylcyclohexyl)-propyl]-methyldiethoxysilane as well as silanes with organic radicals carrying hydroxyl, carboxyl, epoxy and carboxylic acid ester groups. This organic modification can of course also be carried out completely analogously with oxides other than $SiO_2$ and/or with corresponding organic alkoxides of other elements. In the case of modification of the surface of the particles by covalently bonded organic groups, the properties of the particles, in particular in respect of spherical shape and monodispersity, are not influenced, while the advantageous properties which accompany such modification can be perceived.

The preparations according to the invention of the monodisperse spherical oxide particles are in the form of a free-flowing powder. This is formed by agglomerates of the oxide particles, the diameter of which is between 1 μm and 500 μm. The size of the agglomerates is determined in the particular case by the size of the primary particles and by the preparation procedure. The size of the agglomerates is preferably between 10 μm and 300 μm, in particular about 100 μm. The oxide particles are bonded to one another in these agglomerates by a binder, 70 to 95% by weight of oxide particles and 30 to 5% by weight of binder being present. Preferably, 90 to 95% by weight of oxide particles and 10 to 5% by weight of binder are present in the agglomerates. The term binder is to be understood in the broadest sense and is subject only to the restriction that the binder is essentially non-volatile or is composed of essentially non-volatile constituents, in view of the preparation procedure for the preparations according to the invention. Substances or substance mixtures which are correspondingly suitable as binders are to be regarded as those, for example, which are non-volatile at temperatures between 0 and 120° C. under a pressure between 1 and 0.1 bar. Corresponding binders in the narrower sense are, for example, the resins, synthetic resins, monomers, oligomers, polymers, copolymers and polymerizable systems known and customary from the plastics and coatings industry. Typical binders of this type are based on polyolefins, polyacrylates, vinylpolymers, polyamides, polysiloxanes, polyesters, polyethers, polyurethanes and epoxy resin systems. Binders in the broader sense are also oils, fats and waxes, for example based on paraffin, high-boiling glycols, oligoglycols and polyglycols, and ester and ether derivatives thereof.

Those binders which, in view of the later use of the preparations according to the invention, for example as fillers in polymer materials, have a particular compatibility with or even affinity for corresponding materials and systems are in each case preferred. It is thus expedient to choose the polymer systems themselves, or constituents therefrom, in which the oxide particles are to be employed as binders for the preparations according to the invention. Epoxy resin systems, for example for casting compositions for light-emitting diodes, or components thereof are thus outstandingly suitable as binders for preparations according to the invention of monodisperse spherical oxide particles which are to be used as optical diffusers. Monomeric or oligomeric polyester raw materials as well as glycols and oligoglycols are particularly suitable as binders if the oxide particles are to be incorporated into polyester raw materials for film production. Overall, it may be very advantageous to pay attention to universal compatibility or affinity, starting at any surface modification of the oxide particles, via the choice of binder, up to the polymer system employed. The possibility of covalent bonding, via silanizing agents carrying corresponding reactive groups for the surface modification of the oxide particles, to the binder and from there further to the polymeric matrix material is particularly preferred here.

The preparations according to the invention of the monodisperse spherical oxide particles with the binder are obtainable, for example, by mixing the oxide particles in an appropriate ratio with the binder and furthermore a solvent which is volatile at elevated temperature, for example between 0 and 120° C., and/or under reduced pressure, for example between 1 and 0.1 bar, and then removing the solvent from the resulting suspension or dispersion by distillation. The preparations according to the invention are obtained by this procedure in the form of free-flowing powders of agglomerates having diameters of between 1 μm and 500 μm. The weight ratio of binder to solvent in the mixing operation is expediently chosen in the range from 1:1 to 1:100. A high content of solvent is not necessary, especially if only very little binder, for example 5 to 10% by weight, is to be employed in relation to the content of oxide particles, so that complete wetting and impregnation of the particles with the binder is achieved. Suitable solvents are all the customary organic solvents, and also water, if this is capable of adequately dissolving or dispersing the particular binder in an individual case. Possible organic solvents are methanol, ethanol, acetone, ether, ethyl acetate, aliphatic hydrocarbons, such as pentane and hexane, petroleum ether, benzene, toluene, xylene and mixtures of these solvents.

The mixing operation is expediently carried out by dispersing the oxide particles in a mixture of binder and solvent. It may also be favourable for the particles first to be suspended in the solvent and the binder then to be dispersed in the suspension. This procedure is particularly advantageous if water is used as the solvent. The mixing operation is carried out in customary commercially available mixing apparatuses or homogenizers of suitable capacity.

When a homogeneous dispersion of oxide particles, solvent and binder has been obtained, the solvent is removed from this by distillation. This can be carried out expediently by drying by distillation on a rotary evaporator, by thin film evaporation or by spray drying. Apparatuses which are suitable for this purpose are known to the expert and are generally customary. Finally, the preparation according to the invention thus obtained can also be comminuted, if required, and sieved or classified to achieve a uniform agglomerate particle size.

In the preparations according to the invention, the monodisperse spherical oxide particles are enveloped with the binder and bonded to one another to form the agglomerate particles.

Compared with the oxide particle powders as such and liquid dispersions prepared therefrom, the preparations according to the invention have surprising advantageous use properties, in particular in respect of incorporation of the particles into polymer systems. On the one hand, the preparations are subject to no changes in respect of composition and constitution during storage, even over prolonged periods of time. Demixing and sedimentation processes, such as are observed with customary liquid dispersions of the oxide particles, cannot occur. Accordingly, no pretreatment measures, such as, for example, redispersion and homogenization, are necessary before the use as intended. On the other hand, it has been found that with the aid of the preparations according to the invention, the monodisperse spherical oxide particles can be incorporated very easily into polymer systems, and also into any other desired formulations. The oxide particles can be distributed here homogeneously in the matrix materials without reservation. The oxide particle-binder agglomerates disintegrate without problems and completely into the individual particles. This is explained by the fact that the oxide particles are already present as it were in predispersed form in the agglomerates because they are enclosed by the binder. The operation of wetting and binding the untreated oxide particles with the organic medium, which is known to be difficult, is eliminated here. The operation of homogeneous dispersion of the oxide particles in the polymer matrix is particularly effective if the binder of the preparation according to the invention is the same material, a similar material or a material which is compatible with the polymer system. Given the comparatively low content of binder in the preparation, the introduction into the polymer system furthermore is largely not critical; appropriate recipe changes or adjustments are not necessary or are problem-free.

Overall, storage and handling of the preparations according to the invention in the form of free-flowing powders is problem-free and user-friendly.

In the foregoing and in the following examples, unless otherwise indicated, all parts and percentages are by weight.

The entire disclosure of all applications, patents and publications, cited above and below, and of corresponding application(s) German Patent Application P4422118.5, are hereby incorporated by reference.

EXAMPLE 1

700 g of a monodisperse spherical silica gel of 1 $\mu$m particle size (prepared in accordance with EP 0 216 278), which has a surface cover of epoxy groups due to treatment with an epoxy-functionalized silane (Monosphere® 1000 E, E. Merck, Darmstadt) are dissolved in 3.5 l of water in a laboratory disperser (Ultraturrax). 300 g of an epoxy resin hardener component (Araldit MY 790) are then dispersed into this dispersion for 2 hours. The absorption of the resin is effected by the chemically related surface covering of the silica gel.

The dispersion is subjected to spray drying under standard conditions. After further drying of the product in vacuo at 75° C. for 15 hours and passing through a sieve of 300 $\mu$m mesh width, a free-flowing powder is obtained.

A sample of the product is triturated with epoxy resin on a microscope slide. Under the microscope, a uniform agglomerate-free distribution of the silica gel particles in the resin is found.

EXAMPLE 2

300 g of an epoxy resin hardener component (Araldit MY 790) are dissolved in 1200 g of acetone. 700 g of an epoxy-functionalized monodisperse spherical silica gel of 1 $\mu$m particle size (Monospher® 1000 E, E. Merck, Darmstadt) are introduced, while stirring, and the reaction vessel is treated in an ultrasonic bath for 1 hour.

The acetone is stripped off from the resulting dispersion on a rotary evaporator and the product is then dried at 75° C. in vacuo for 15 hours. Passing through a 300 $\mu$m sieve gives the product in the form of a free-flowing powder.

EXAMPLE 3

600 g of a monodisperse spherical silica gel of 250 nm particle size (prepared according to EP 0 216 278) are dispersed in 1750 ml of ethanol. 275 g of ethylene glycol are then dissolved in this dispersion, while stirring intensively. The ethanol is stripped off from the dispersion on a rotary evaporator or a thin film evaporator. Subsequent drying and sieving are carried out as in the above examples.

EXAMPLE 4

100 g of a monodisperse spherical silica gel of 500 nm particle size (prepared according to EP 0 216 278) are dispersed in a solution of 176 g of polyethylene glycol dimethyl ether 500 and 2.1 l of water. The water is removed from the dispersion on a thin film evaporator. Subsequent drying and sieving are carried out as in the above examples.

EXAMPLE 5

600 g of a monodisperse spherical silica gel of 100 nm particle size (prepared according to EP 0 216 278), which has a surface covering of methyl methacrylate groups due to treatment with a methyl methacrylate-functionalized silane, are dispersed in a mixture of 1500 g of ethyl acetate and 32 g of an acrylate resin. The solvent is stripped off from the dispersion on a rotary evaporator. Subsequent drying and sieving are carried out as in the above examples.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Preparations of monodisperse spherical oxide particles having a particle diameter between 10 nm and 10 $\mu$m and an essentially non-volatile binder in the form of a free-flowing powder of agglomerates having a diameter of between 1 μm and 500 μm, in which the particles are bonded to one another by the binder and in which 70 to 95% by weight of oxide particles and 30 to 5% by weight of binder are present, obtainable by mixing the oxide particles homogeneously with the binder in a corresponding ratio together with a solvent which is volatile at temperatures between 0 and 120° C. under a pressure between 1 and 0.1 bar, the binder and solvent being present in a weight ratio of 1:1 to 1:100, and then removing the solvent from the resulting suspension or dispersion by distillation, wherein the monodisperse spherical oxide particles comprise $SiO_2$, $TiO_2$, $ZrO_2$, $Al_2O_3$ or a mixture thereof, are obtained by hydrolytic polycondensation of alkoxides and have a surface modified by covalently bonded organic groups.

2. Preparations according to claim 1, characterized in that the binder is a soluble polymer or a polymerizable system.

3. Preparations as in claim 2, wherein the soluble polymer selected from the group consisting of polyolefins, polyacrylates, vinylpolymers, polyurethanes, polyamides, polysiloxanes, polyesters, polyethers and the polymerizable system is an epoxy resin system.

4. Process for the preparation of preparations according to claim 1, characterized in that 70 to 95% by weight of monodisperse spherical oxide particles with a particle diameter between 10 nm and 10 μm are mixed homogeneously with 30 to 5% by weight of an essentially non-volatile binder together with a solvent which is volatile at elevated temperature and/or under reduced pressure, the binder and solvent being present in a weight ratio of 1:1 to 1:100, and the solvent is then removed from the resulting suspension or dispersion by distillation, a free-flowing powder of agglomerates with a diameter between 1 μm and 500 μm being obtained without flocculation.

5. Process according to claim 4, characterized in that the particles are dispersed in a mixture of binder and solvent.

6. Process according to claim 5, characterized in that the solvent is removed by drying by distillation on a rotary evaporator, by thin film evaporation or by spray drying.

7. Process according to claim 4, characterized in that the particles are first suspended in the solvent and the binder is then dispersed in the suspension.

* * * * *